United States Patent Office 2,783,952
Patented Mar. 5, 1957

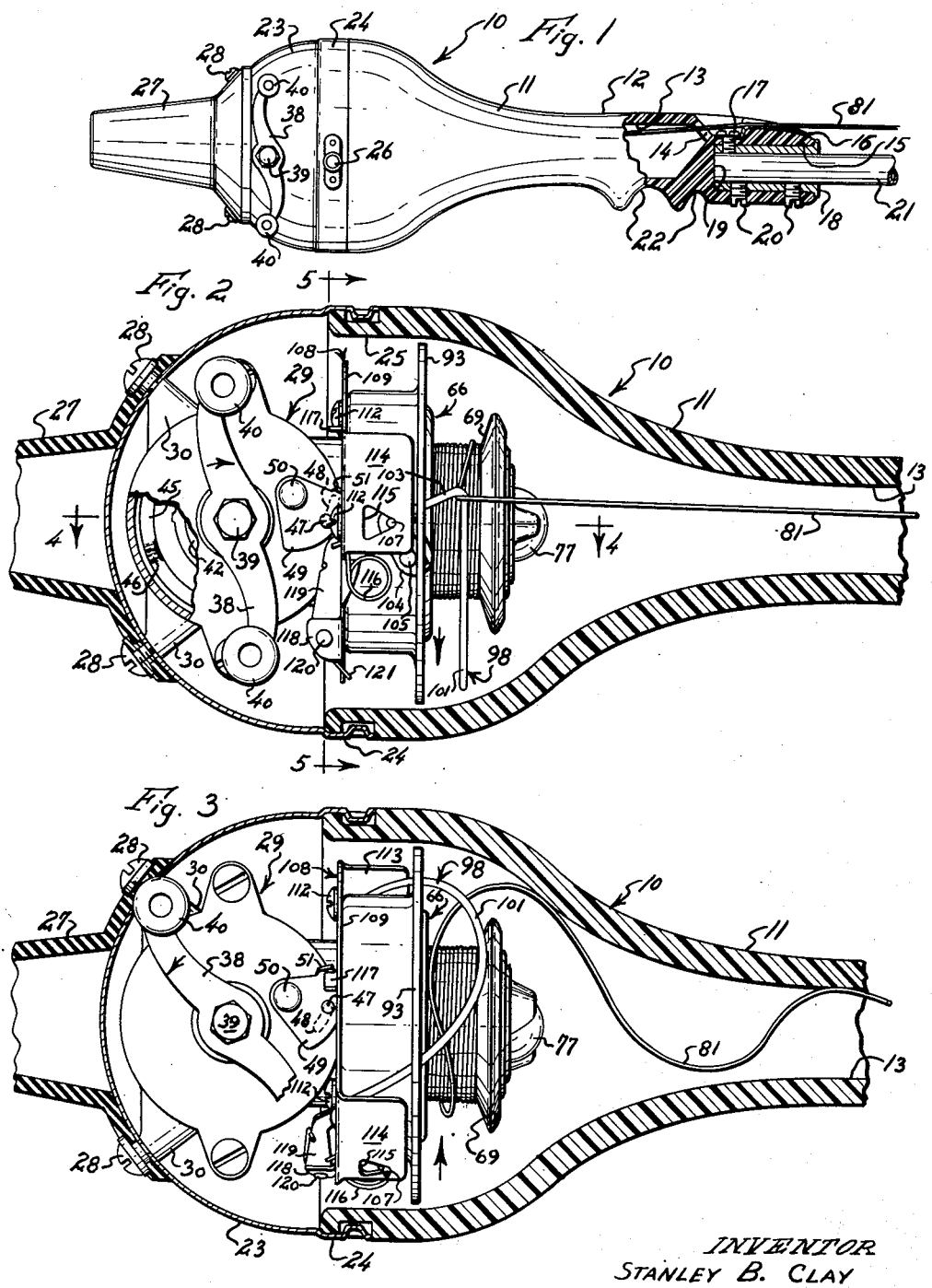

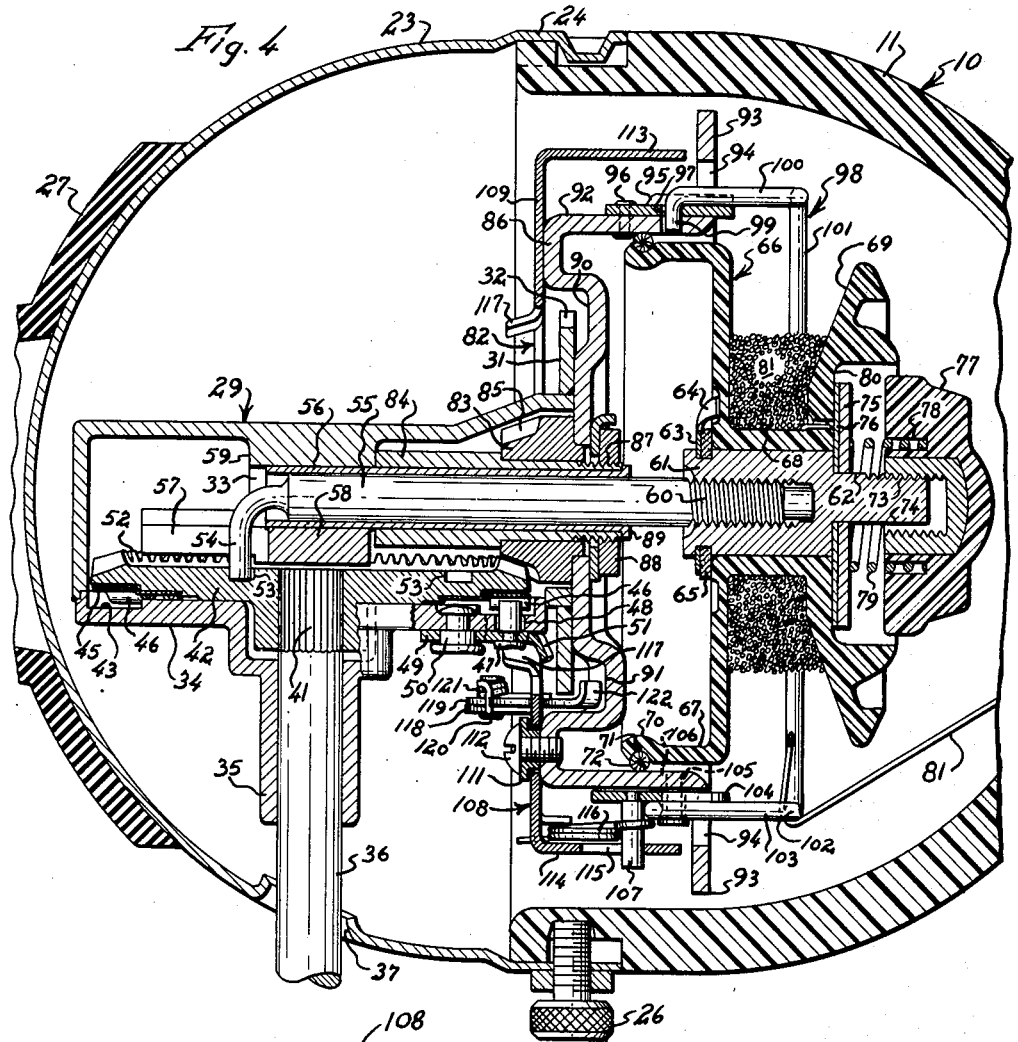

2,783,952
SPINNING REEL

Stanley B. Clay, Pontiac, Mich., assignor to Great Lakes Products, Inc., Detroit, Mich., a corporation of Michigan Application June 4, 1954, Serial No. 434,582

2 Claims. (Cl. 242—84.4)

This invention relates to a spinning reel for fishing and more particularly to a pick-up mechanism for winding and releasing fishline from a spool.

In most conventional spinning reels, the reel is mounted in open fashion upon the reel seat of a fish rod and a pick-up arm rotates around a spool, the axis of which lies substantially in alignment with the longitudinal disposition of the fish rod. The pick-up arm guides the line and lays it tangentially upon the spool as long as the handle of the conventional spinning reel is rotated in a forward or winding direction. When it is desired to cast the line out the pick-up arm is manually swung out of the way and the lure and line is cast in the usual movement. The line plays off the forward end of the spool without causing the spool to turn.

The present invention contemplates a spinning reel of the type employing a pick-up within an enclosed housing, which can be operated without directly touching or handling the mechanism at all.

It is therefore an important object of the invention to provide an efficient spinning reel of the type where fishline is wound tangentially upon a spool disposed axially to the line of travel of the fishline along the fish rod, the mechanism for winding being disposed substantially within a streamlined enclosed handle and housing and being controllable entirely from within.

It is another object of the invention to provide a spinning reel of the class described in which a handle extending to the outside of the reel housing can be reversed for a short distance to cause disengagement of the pick-up with the fish line for free spinning of the line during casting of a lure, and on forward movement of the handle will reset the pick-up and wind the line tangentially upon the spool.

It is a further object of the invention to provide a spinning reel with a bail pick-up which is mounted across a revolving element surrounding a nonrotating spool, the bail and outer parts providing no free ends or protuberances upon which the fishline can become caught or entangled.

It is a still further object of the invention to provide quick acting release mechanism whereby the handle of the spinning reel need be reversed but a fraction of a turn to swing a pick-up bail out of winding position to permit casting and said handle need only be again turned in forward direction but a fraction of an inch to cause the bail to re-engage the fishline for winding.

These and other objects and advantages of my invention will more fully appear from the following description made in connection with the accompanying drawings wherein like reference characters refer to similar parts throughout the several views and in which:

Fig. 1 is a side elevation of my spinning reel, the forward end thereof at the connection with a fish rod being broken away in vertical section and unessential portions of the view being deleted;

Fig. 2 is an enlarged view of the spinning reel shown in Fig. 1, the reel housing being sectioned vertically and unessential portions being cut away from the view. The pick-up mechanism is shown in winding condition, the handle being turned in a clockwise direction;

Fig. 3 is a view similar to Fig. 2, the pick-up mechanism being swung out of the way by reverse movement of the handle in counterclockwise direction;

Fig. 4 is an enlarged horizontal sectional view of the reel mechanism taken on the line 4—4 of Fig. 2, portions of the mechanism being shown in full line and other portions being cut away; and Fig. 5 is a vertical section to the rear of the rotating portion of the reel mechanism taken on the line 5—5 of Fig. 2.

Referring now more particularly to the drawing, my spinning reel is mounted within a reel housing indicated generally at 10, and which in turn comprises a hollow forwardly tapered tube 11 which terminates in a handle 12, as shown in Fig. 1. The inner walls of the tapered tubular portion 11 are preferably smoothly contoured so as to prevent sharp bending or catching of the fishline when it is played in and out of the reel. The tubular opening is shown at the broken portion in Fig. 1 at 13 and terminates upwardly in an orifice 14 which overlies the tip end 15 of the reel. A thumbing plate 16 is secured to the forward hand grip portion of the reel by such means as screw 17. A bushing 18 is secured in an opening 19 formed longitudinally of the reel housing 10 at the forward end 15 and is secured in position by the screw 17 and by such additional screws 20 as may be desired. The bushing 18 is adapted to receive a fish rod 21 which may be of the glass fiber type or conventional steel and bamboo, depending upon the requirements of the fisherman. The handle portion 12 is preferably provided with molded finger grip troughs 22 which assist in maintaining a firm manual grip upon the reel member. The reel housing 10 is also provided with a rearward cup-shaped portion 23 which is adapted to interfit with the tubular portion 11 at a forward flange 24 which overlies the grooved edge 25 shown particularly in Fig. 2. A thumb nut 26 is mounted upon the flange 24 and secures the rearward cup-shaped portion 23 to the tubular portion 11 when placed in the position shown in Fig. 1 with the thumb nut screwed in place. A rest member 27 which is preferably formed of plastic or rubber may be secured by such means as screws 28 to the rearwardmost portion of the cup-shaped member 23.

A mount for the internal mechanism comprising the reel structure consists of a cylindrical housing shown generally at 29, the housing having rearwardly angled bosses 30 which are drilled and tapped so as to receive the same screws 28 which fasten the rest members 27 in position. The cylindrical housing 29 has a clutch plate 31 secured rigidly thereto at its forward portion as shown in Fig. 4 and the clutch plate is provided with a notched periphery, the notches being three in number and indicated at 32 in Fig. 5. The forward portion of the housing 29 has an opening 33 which is axial with respect to the rigid clutch plate 31. The cylindrical housing has an end plate 34 which is provided with a bearing 35 as shown in Fig. 4.

The bearing 35 has mounted therein a shaft 36 which extends outwardly through the reel housing 10 at opening 37 and terminates in a crank handle 38 which may be fixed to the end of shaft 36 by such means as nut 39. The handle 38 may be of the double-arm variety, each arm having a rotatable finger grip 40 for rotating the crank shaft 36. The inner end of shaft 36 is splined at 41 and the splined portion 41 in turn is in pressed fitting relation with the large gear 42 which lies inside the housing 29 as shown in Fig. 4. The end plate 34 has a pair of arcuate grooves or slots 43 and 44 formed therewithin and a wafer 45 has offset bends 46 which lie within the arcuate grooves or slots 43 and are adapted to permit limited rotation of the wafer with respect to the end plate 34. The offset bends 46 are crimped in closely spaced relation at both sides of the wafer and are adapted to override a pin 47 which in turn lies within a slot 48 in the end plate 34 as shown by dotted line configuration in Figs. 2 and 3. The pin 47 is fixed to the clutch pawl 49 which in turn is pivotally mounted to the end plate 34 by means of the rivet 50. The clutch pawl 49 has a laterally extending tooth 51, the function of which will be described later in the specification. The gear 42 lies in frictional engagement with the wafer 45 and upon forward rotation of the crank handle 38 as shown in Fig. 2, will cause the wafer to be rotated in the same direction until the crimped or offset bends 46 will come to the ends of arcuate slots 43. At the same time, of course, the clutch pawl 49 will be caused to rotate in a clockwise direction until the pin 47 strikes the bottom of its slot 48. On reverse rotation of the crank handle as shown in Fig. 3, the wafer 45 will rotate for a short distance in a counterclockwise direction, thus reversing the movement of the clutch pawl 49 to the position shown in Fig. 3. It is, of course, understood that the wafer places very little drag upon the gear 42 and, once it has stopped in its abutted relation, will remain in that position until the direction of rotation of handle 38 is reversed.

The gear 42 has annular crown teeth 52 which face inwardly toward the space within the cylindrical housing 29, and the medial area within the crown gear teeth 52 has formed therewithin a cam slot 53 which extends around the axis of the crank shaft 36 in eccentric relation for engaging the cam pin 54 of the spool mounting rod 55 as shown in Fig. 4. The spool mounting rod in turn lies within sleeve 56 which is secured within the axial opening 33 previously described and may be reciprocated longitudinally in the sleeve 56 and in the general axial alignment of the entire reel housing 10. The cam pin 54 is guided in the slot 57 which is in turn formed in the mount 58. The mount 58 in turn is secured to the boss 59 on the cylindrical housing 29 and holds the sleeve 56 in secure engagement for the reciprocation of the spool mounting rod 55 as before noted.

The spool mounting rod 55 is provided with a threaded end 60 to which is secured a bushing member 61, the latter having a shouldered, diminished forward end 62 as shown in Fig. 4. The rearward end of the bushing 61 has secured thereto a spring ratchet member 63 having an offset spring tooth 64 and a friction plate 65 annularly mounted to the bushing 61 as shown. Mounted for rotation on the bushing 61 at the enlarged portion thereof is the spool indicated generally at 66. The spool 66 in turn has a rear or inner flange portion 67, a cylindrical body or line-receiving surface 68 at the medial portion thereof, and a forward or outer flange portion 69, all as shown in Fig. 4. The inner or rearward flange 67 is provided with an annular rim 70 having an outer groove 71 within which an endless piece of packing 72 is disposed for a purpose to be later disclosed. The shouldered and diminished forward portion 62 of the bushing 61 is threaded at 73 and is provided with a flattened key area 74 to receive a friction plate 75 in keyed relation against rotation and the inner surface of which contains a friction disc 76 as shown. A tension adjusting thumb nut 77 is threadably mounted upon the threads 73 and has an annular groove 78 which is adapted to receive a compression spring 79 which bears against the nut 77 and the plate 75 as shown. The friction plate 76 engages the annular surface 80 of the outer or forward flange 69 and causes the spool to be rigidly retained with respect to the bushing member 61 and the spool mounting rod 55 under normal circumstances. The line-receiving surface portion 68 is adapted to receive in coiled relation a length of fish line 81 as shown in Figs. 2, 3 and 4, and when the tension on the free end of line 81 is increased to a predetermined degree, the spool 66 will rotate on the bushing 61 against the friction of the opposed plates 65 and 76. If it is desired to vary the slipping point of spool 66, the manual thumb nut 77 may be adjusted accordingly. Reverse rotation of spool 66 is prevented by the spring tooth 64 of the ratchet member 63.

Mounted for rotation on the sleeve member 56 is a rotary driven member indicated generally at 82. The pinion gear 83 has a rigidly formed elongated hub 84 which is in immediate contact with the outer surface of sleeve 56 and the pinion gear 83 is aligned so that teeth 85 thereof intermesh with the teeth 52 of the large gear member 42. Also rigidly secured to the pinion gear 83 is a forwardly facing cup-shaped wheel 86, the wheel being secured to the pinion gear and hub members by a threaded extension 87 upon which a nut 88 is tightly drawn as shown in Fig. 4. The outwardly extending threaded portion 87 abuts against a flared shoulder 89 at the outer end of sleeve member 56 and is rotatable thereagainst. The cup-shaped wheel 86 has an annular rearward groove 90 in which a further offset recess 91 is formed for a purpose to be subsequently described. The outer periphery of the cup-shaped wheel has a forwardly extending cylindrical shell portion 92 which terminates forwardly in a flared flange 93. The outer flared flange 93 contains a pair of peripheral arcuate slots 94 as shown in Fig. 4.

A grooved bracket 95 is secured to the cylindrical portion 92 of the cup-shaped wheel 86 as by rivets 96, and an opening 97 is formed therethrough and also through the cylindrical wheel portion 92 for the reception of one end of a curved bail 98. The bail 98 has an inwardly extending stub shaft 99 for engagement with the opening 97 to which is secured an outwardly extending short arm portion 100 and an arcuate length 101 which is shaped substantially in a semi-circle as shown in Figs. 2, 3 and 4 and terminates at the opposite end in a line-retaining loop 102 and an inwardly extending arm 103 which is rigidly secured to a crank arm 104. The crank arm has a pivot pin 105 which extends through an opening 106 formed in the cylindrical portion 92 of the cup-shaped wheel and in diametric relation with the opening 97 and bail end 99. The crank arm 104 has secured radially with respect to the pivot pin 105, a crank pin 107 which extends outwardly for engaging the bail actuator about to be described.

The bail actuator is indicated generally at 108 and has as its main body portion an annular plate 109 as shown in Figs. 4 and 5. The annular plate 109 has three equally spaced arcuate slots 110 which are guidedly secured to guide pins 111, the latter being secured in circular formation to the rear of the cup-shaped wheel 86 by such means as screws 112, as shown in Figs. 4 and 5. The bail actuator is therefore permitted to rotate through a short arcuate distance with respect to the cup-shaped wheel 86. The annular plate 109 has a pair of forwardly extending flange members 113 and 114 as shown in Fig. 3. The flange 114 in turn has a cam opening 115 of triangular shape, the inner peripheral edges of which are adapted to cooperate with the crank pin 107 of the bail 101 as shown in Figs. 2, 3 and 4. A small coil spring 116 is interposed between the annular plate 109 and crank pin 107 so as to urge the crank outwardly from the annular plate. This spring pressure is exerted whether the crank pin is above or below the pivot pin 105 as shown in Fig. 2. Formed rearwardly of the inner periphery of annular plate 109 are three equally spaced ears or abutments 117 as shown in Fig. 5. There is also formed an offset bracket 118 from annular plate 109 and to this plate is pivotally attached a latch member 119 at the pivot point 120. A coil spring 121 causes latch member 119 to be urged forwardly against the rear surface of annular plate 109.

At the outer end of latch 119 is formed a forwardly extending tooth member 122 so that it may lie forwardly within the recessed area 91 of the cup-shaped wheel 86 and permit the free relative rotation of the driven member 82 with respect to the clutch plate 31.

In the use and operation of my spinning reel, the handle 38 may be freely rotated in a clockwise direction as viewed in Fig. 2 which causes shaft 36 and large crown gear 42 to intermesh with the smaller pinion gear 83 and rotate the entire driven member including the cup-shaped wheel 86 and the bail actuator 108. The line-engaging and guiding element 98 is then in the position shown in Fig. 2 with the arcuate portion thereof in close clearance with the forward flange of the cup-shaped wheel and in alignment with the line-receiving surface 68 of the non-rotating spool element 66. The line-engaging and guiding element will then pick up the free end of line 81 no matter what its position in the housing and cause it to lie within the curved portion 102 as shown in Figs. 2 and 4. Continued rotation of handle element 38 will cause the driven member to rotate and to lay line 81 tangentially upon the non-rotatable spool as shown in Fig. 2. The spool will, of course, oscillate forwardly and rearwardly, once for each rotation of handle element 38, since the cam pin 54 will lie in engagement with cam groove 53 and move forwardly and rearwardly with rotation of the large gear 42. The line 81 is then caused to be applied tangentially across the line-receiving surface 68 without becoming bunched up at any one position. During the forward rotation of handle 38, the wafer 45 will be frictionally urged in a clockwise direction so as to depress the clutch pawl 49 and bring the pawl tooth 51 forwardly as shown in Fig. 2. In this position, the tooth will lie in clearance with respect to the ears or abutments 117 and permit the driven member to freely rotate. Should an excessive tension be applied to the free end of line 81, as when the line becomes snagged or when a large fish strikes a lure secured to the end thereof, the spool 66 may yield under the frictional pressure of plates 65 and 76 and rotate in the opposite direction, thus permitting the free end of line 81 to move outwardly while still in engagement with the line-retaining loop 102. If it is desired to increase the frictional tension, the manual thumb nut 77 is turned inwardly to compress spring 79 and thereby raise the frictional limit at which the spool 66 will yield and unwind under tension of the free end of line 81. The tension is, of course, maintained at some point behind the breaking strength of the line and thereby becomes a safety factor which will permit maximum force to be applied as when playing a fish without running the danger of breaking the line.

Preceding a casting operation or when it is desired to permit line to play out as during trolling, the handle 38 is given a reverse movement in counterclockwise direction from the position shown in Fig. 2. Immediately the friction wafer 45 will move with the large gear 42 and pin 47, and the clutch pawl 49 will move upwardly from the position in Fig. 2 to the position shown in Fig. 3. The offset bends 46 which surround the pin cause the movement, and since the clutch pawl has moved outwardly to the limit of its position, the wafer will again stop and permit frictional movement of the gear 42.

It is understood that very little friction need be created by the contact between the wafer 45 and the face of gear 42 in order to effect the proper movement of clutch pawl 49. The pawl tooth 51 will now be in raised position and intercepting the peripheral alignment of the rearwardly extending ears or abutments 117. Since there are three of these abutments or ears, it is never necessary to reverse handle 38 for more than a third of a turn and most of the time in a much smaller fraction of a complete turn.

As soon as one of the ears or abutments 117 engages the pawl tooth 51, the bail actuator 108 will cease to rotate and will be held against counterclockwise rotation as viewed in Fig. 5. Since, however, the large gear 42 and the pinion gear 83 are still engaged, continued rotation of handle 38 through a very short continued distance will cause the cup-shaped wheel 86 to rotate for a short distance in a counterclockwise direction after the bail actuator has been stopped by pawl tooth 51. When this occurs, the triangular cam opening 115 on the bail actuator will engage the pin 107 and rotate the pin in a counterclockwise direction from the position shown in Fig. 2. Since the arm, pin and bail are all rigidly secured together, the bail member will be caused to move also about the pivot pins 105 and 99. The arcuate portion of the elongated bail which previously lay in spaced clearance with the flange 93 is now opened up to the position shown in Fig. 3, the arcuate portion lying well without the periphery of the outer flange 69 of spool 66. Coil spring 116 causes the pin 107 to move upwardly into the forwardmost apex of the triangular cam opening 115 in either event, that is whether the pin is in the upper position as shown in Fig. 2 or is in the lower position as shown in Fig. 3.

At the same time that the cup-shaped wheel was caused to rotate the slight additional distance counterclockwise in Fig. 5, the tooth 122 of latch 119 was caused to climb out of the recess 91 and to lie against the rear face 90 of the cup-shaped wheel 86. The peripheral notches 32 of clutch plate 31 are so positioned as to receive a portion of the tooth 122 during this rearward climbing movement. The peripheral notches 32 which were aligned with the latch tooth 122, will thus prevent rotation of the entire driven member as long as the line-engaging and guiding element has been actuated to the position shown in Fig. 3.

The free end of line 81 may now strip freely from the axis of spool 66 and feed out through the orifice 14 and over the thumbing plate 16 as shown in Figs. 1 and 3. The user grips the forward portion 12 of the reel housing and applies the thumb over line 81 to control the same. When it is again desired to retrieve the line, the handle 38 is moved from its position shown in Fig. 3 in a clockwise rotation. The first movement will cause the lower edge of the triangular cam opening 115 to engage pin 107 and switch the bail or line-engaging and guiding element 98 over the spool 66 and back into the position of Fig. 2. At the same time the recess 91 will again permit the latch tooth 122 to drop therein and be out of engagement with any of the ears or abutments 117 so that the handle 38 can continue uninterrupted and cause the driven member to again retrieve line as previously described.

It may thus be seen that I have devised a novel enclosed spinning reel in which the entire operation including the proper tangential winding of line upon a spool and conditioning of the reel for strip casting axially of the spool is accomplished through a simple rotation of the handle either in a forward or reverse direction as the case may be. As a consequence, all the advantages of an enclosed reel have been maintained without sacrificing the free stripping and easy control during casting of the spinning type reel.

It will, of course, be understood that various changes may be made in the form, details, arrangement and proportions of the various parts without departing from the scope of my invention.

What is claimed is:

1. A spinning reel of the type having a spool with a line-receiving surface mounted thereon and held against winding rotation, comprising a cylindrical wheel mounted for rotation rearwardly of said spool, a bail for engaging and guiding a fishline pivotally mounted across said wheel and swingable from a line-engaging position overlying the line-receiving surface across the axis of said wheel into an out of line-engaging position, a driven member having a handle for rotating said cylindrical wheel in winding direction with the bail in engagement with said line and for reversing said wheel through a limited distance, a pawl tooth engaged with light frictional contact with said driven member and swingable to a stop position intercepting the path of said wheel upon reverse driving direction of said handle, a bail actuator rotatable with said cylindrical wheel in winding direction and having an abutment defining a path which intercepts said pawl tooth when in stop position under reversal of said direction of rotation of the driven member and cooperating cam means engaging between said wheel and said bail actuator and operable on continued reverse movement of the driven member to swing said bail across the axis of the driven member from line-engaging position to out-of-line-engaging position.

2. The subject matter set forth in claim 1, and plate means mounted against rotation and having locking engagement with said cylindrical wheel to prevent accidental rotation thereof when said bail is out of line-engaging position.

References Cited in the file of this patent

UNITED STATES PATENTS

| | | |
|---|---|---|
| 2,299,156 | Lind | Oct. 20, 1942 |
| 2,492,587 | Ledingham | Dec. 27, 1949 |
| 2,665,856 | Shakespeare et al. | Jan. 12, 1954 |
| 2,668,024 | Campbell | Feb. 2, 1954 |

FOREIGN PATENTS

| | | |
|---|---|---|
| 598,412 | Great Britain | Feb. 18, 1948 |
| 941,464 | France | July 19, 1948 |